US011649985B2

(12) United States Patent
Dettmering

(10) Patent No.: US 11,649,985 B2
(45) Date of Patent: May 16, 2023

(54) HYBRID WATER SYSTEM WITH AN INLET AND OUTLET BYPASS

(71) Applicant: Rinnai America Corporation, Peachtree City, GA (US)

(72) Inventor: Matthew Ryan Dettmering, Newnan, GA (US)

(73) Assignee: Rinnai America Corporation, Peachtree City, GA (US)

(*) Notice: Subject to any disclaimer, the term of this patent is extended or adjusted under 35 U.S.C. 154(b) by 0 days.

(21) Appl. No.: 17/528,809

(22) Filed: Nov. 17, 2021

(65) Prior Publication Data
US 2022/0170667 A1    Jun. 2, 2022

Related U.S. Application Data

(60) Provisional application No. 63/119,177, filed on Nov. 30, 2020.

(51) Int. Cl.
*F24D 17/00* (2022.01)
*F22B 35/00* (2006.01)
*F24H 9/13* (2022.01)

(52) U.S. Cl.
CPC ........... *F24H 9/13* (2022.01); *F24D 17/0036* (2013.01); *F24D 17/0078* (2013.01)

(58) Field of Classification Search
CPC .......... F24H 9/13; F24H 9/06; F24D 17/0036; F24D 17/0078; F24D 2200/043; F22B 27/00; F22B 35/005; F22B 35/008
See application file for complete search history.

(56) References Cited

U.S. PATENT DOCUMENTS

| | | | | |
|---|---|---|---|---|
| 5,193,138 A | * | 3/1993 | Richey | F24D 11/002 165/104.19 |
| 10,760,823 B2 | * | 9/2020 | Knoblett | F24H 9/2035 |
| 11,226,136 B2 | * | 1/2022 | Knoblett | F24H 9/2028 |
| 2008/0152331 A1 | * | 6/2008 | Ryks | F24D 17/0031 392/490 |
| 2019/0293303 A1 | * | 9/2019 | Zhang | F24D 17/02 |

\* cited by examiner

*Primary Examiner* — Gregory A Wilson
(74) *Attorney, Agent, or Firm* — Meunier Carlin & Curfman LLC

(57) ABSTRACT

A hybrid tank and tankless hot water system with an inlet bypass and an outlet bypass are configurable between a hybrid heater configuration and an on-demand configuration. In the hybrid heater configuration, the inlet bypass supplies cold water to a cold water inlet of a storage tank and the outlet bypass supplies hot water from an outlet manifold to a recirculation inlet of the storage tank. In an on-demand configuration, the inlet bypass supplies cold water to a cold water manifold for directly providing cold water to hot water heaters and the outlet bypass supplies hot water from the outlet manifold directly to a system hot water outlet. In the bypass configuration, a storage tank and/or recirculation pump are fluidically isolated from one or more hot water heaters to facilitate their maintenance, repair, replacement while still supplying hot water on demand from the hot water heaters.

14 Claims, 3 Drawing Sheets

HYBRID WATER SYSTEM WITH AN INLET AND OUTLET BYPASS

CROSS REFERENCE TO RELATED APPLICATIONS

This application claims priority to U.S. Provisional Patent Application Ser. No. 63/119,177 filed Nov. 30, 2020, the disclosure of which is expressly incorporated herein by reference.

BACKGROUND

The need for heated fluids, and heated water, has long been recognized. Conventionally, water has been heated by heating elements, either electrically or with gas burners, while stored in a tank or reservoir. While effective, energy efficiency and water conservation using a storage tank alone can be poor. As an example, water that is stored in a hot water storage tank is maintained at a desired temperature. Thus, unless the storage tank is well insulated, heat loss through radiation can occur, requiring additional input of energy to maintain the desired temperature. In effect, continual heating of the stored water in the storage tank is required.

Many of the problems with traditional hot water storage tanks have been overcome using tankless water heaters. With the tankless water heater, incoming ground water passes through a component generally known as a heat exchanger and is instantaneously heated by heating elements (or gas burner) within the heat exchanger until the temperature of the water leaving the heat exchanger matches a desired temperature set by a user of the system. With such systems the heat exchanger is typically heated by a large current flow (or Gas/BTU input) which is regulated by an electronic control system. The electronic control system also typically includes a temperature selection device, such as a thermostat, by which the user of the system can select the desired temperature of the water being output from the heat exchanger.

Tankless water heaters are often used in conjunction with one another to heat cold water and recirculate water through a water heating system. Using multiple tankless water heaters together provides for large capacity and redundant operations in a small footprint. A plurality of tankless water heaters may also be used in conjunction with a hot water storage tank to expand the capacity of hot water that the system is able to supply.

SUMMARY

A first aspect of the disclosure provides a hybrid tank and tankless water heater system configured to receive cold water at a system cold water inlet and provide hot water to a system hot water outlet. The hybrid tank and tankless water heater system comprises a storage tank comprising a cold water inlet, a recirculation inlet, and a hot water outlet. The hybrid tank and tankless water heater system comprises a water heater comprising a cold water inlet and a hot water outlet. The hybrid tank and tankless water heater system comprises an inlet bypass. The inlet bypass comprises a storage inlet shut-off valve positioned to control fluid flow through the cold water inlet of the storage tank. The inlet bypass comprises an inlet bypass circuit positioned between the system cold water inlet and the cold water inlet of the water heater. The inlet bypass comprises an inlet bypass circuit shut-off valve positioned to control fluid flow through the inlet bypass circuit.

In some implementations of the first aspect of the disclosure, the hybrid tank and tankless water heater system comprises a second water heater comprising a second cold water inlet and a second hot water outlet. The hybrid tank and tankless water heater system comprises an inlet manifold fluidically coupled to the cold water inlet of the water heater and the second cold water inlet of the second water heater. The inlet bypass circuit is positioned between the system cold water inlet and the inlet manifold.

In some implementations of the first aspect of the disclosure, the inlet bypass is configurable in a hybrid heater configuration and an on-demand configuration. In the hybrid heater configuration, the storage inlet shut-off valve is open and the inlet bypass circuit shut-off valve is closed. In the on-demand configuration, the storage inlet shut-off valve is closed and the inlet bypass circuit shut-off valve is open.

In some implementations of the first aspect of the disclosure, the hybrid tank and tankless water heater system comprises an outlet bypass in fluid communication with the hot water outlet of the water heater. The outlet bypass comprises a recirculation inlet shut-off valve positioned to control fluid flow to the recirculation inlet of the storage tank. The outlet bypass comprises an outlet bypass circuit positioned between the hot water outlet of the water heater and the system hot water outlet. The outlet bypass comprises an outlet bypass circuit shut-off valve positioned to control fluid flow through the outlet bypass circuit.

In some implementations of the first aspect of the disclosure, the hybrid tank and tankless water heater system comprises a second water heater comprising a second cold water inlet and a second hot water outlet. The hybrid tank and tankless water heater system comprises an outlet manifold fluidically coupled to the hot water outlet of the water heater and the second hot water outlet of the second water heater. The outlet bypass circuit is positioned between the outlet manifold and the system hot water outlet.

In some implementations of the first aspect of the disclosure, the storage tank further comprises a recirculation outlet. The system further comprises a recirculation pump positioned to draw water from the recirculation outlet and pump water to the cold water inlet of the water heater.

In some implementations of the first aspect of the disclosure, the system further comprises a pump outlet isolation valve positioned between the recirculation pump and the cold water inlet of the water heater.

In some implementations of the first aspect of the disclosure, an outlet of the inlet bypass circuit is positioned to supply cold water between the pump outlet isolation valve and the cold water inlet of the water heater.

In some implementations of the first aspect of the disclosure, the storage inlet shut-off valve is positioned between the inlet bypass circuit and the cold water inlet of the storage tank.

A second aspect of the disclosure provides a storage tank of a hybrid tank and tankless water heater system configured to receive cold water at a system cold water inlet and provide hot water to a system hot water outlet. The storage tank system comprises a storage tank comprising a cold water inlet in fluid communication with the system cold water inlet, a recirculation inlet, and a hot water outlet in fluid communication with the system hot water outlet. The storage tank system comprises an inlet bypass. The inlet bypass comprising a storage inlet shut-off valve positioned to control fluid flow through the cold water inlet of the storage tank. The inlet bypass further comprises an inlet bypass circuit positioned between the system cold water inlet and a cold water inlet of the tankless water heater system. The inlet bypass further comprises, an inlet bypass circuit shut-off valve positioned to control fluid flow through the inlet bypass circuit.

In some implementations of the second aspect of the disclosure, the tankless water heater system comprises a plurality of tankless water heaters. The storage tank system further comprises an inlet manifold fluidically coupled to a cold water inlet of the plurality of tankless water heaters, wherein the inlet bypass circuit is positioned between the system cold water inlet and the inlet manifold.

In some implementations of the second aspect of the disclosure, the inlet bypass is configurable in a hybrid heater configuration and an on-demand configuration. In the hybrid heater configuration, the storage inlet shut-off valve is open and the inlet bypass circuit shut-off valve is closed. In the on-demand configuration, the storage inlet shut-off valve is closed and the inlet bypass circuit shut-off valve is open.

In some implementations of the second aspect of the disclosure, the storage tank system further comprises an outlet bypass in fluid communication with a hot water outlet of the tankless water heater system. The outlet bypass comprises a recirculation inlet shut-off valve positioned to control fluid flow to the recirculation inlet of the storage tank. The outlet bypass comprises an outlet bypass circuit positioned between the hot water outlet of the tankless water heater system and the system hot water outlet. The outlet bypass comprises an outlet bypass circuit shut-off valve positioned to control fluid flow through the outlet bypass circuit.

In some implementations of the second aspect of the disclosure, the tankless water heater system comprises a plurality of tankless water heaters. The storage tank system further comprises an outlet manifold fluidically coupled to a hot water outlet of the plurality of tankless water heaters, wherein the outlet bypass circuit is positioned between the outlet manifold and the system hot water outlet.

In some implementations of the second aspect of the disclosure, the storage tank system further comprises a recirculation outlet. The storage tank system further comprises a recirculation pump positioned to draw water from the recirculation outlet and pump water to the cold water inlet of the tankless water heater system.

In some implementations of the second aspect of the disclosure, the storage tank system further comprises a pump outlet isolation valve positioned between the recirculation pump and the cold water inlet of the tankless water heater system.

In some implementations of the second aspect of the disclosure, an outlet of the inlet bypass circuit is positioned to supply cold water between the pump outlet isolation valve and the cold water inlet of the tankless water heater system.

In some implementations of the second aspect of the disclosure, the storage inlet shut-off valve is positioned between the inlet bypass circuit and the cold water inlet of the storage tank.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
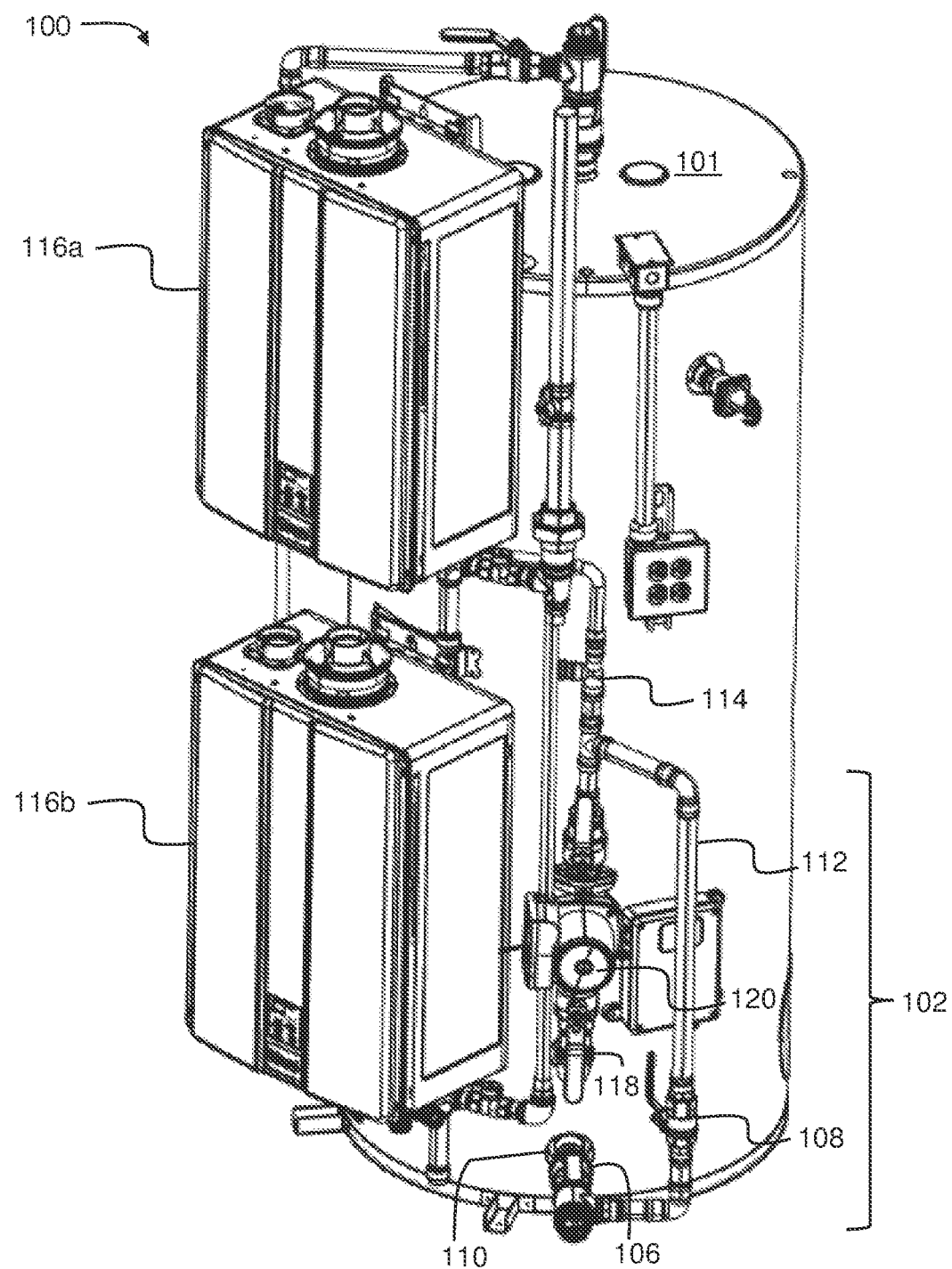
FIGS. 1A-1C illustrates a hybrid tank and tankless hot water system with an inlet bypass and an outlet bypass suitable for implementing the several embodiments of the disclosure.

It should be understood at the outset that although illustrative implementations of one or more embodiments are illustrated below, the disclosed systems and methods may be implemented using any number of techniques, whether currently known or in existence. Like numbers represent like parts throughout the various figures, the description of which is not repeated for each figure. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

Pairing a plurality of tankless water heaters with a storage tank provides high capacity and redundant systems for delivering hot water to a building. In a recovery operation, a pump is configured to circulate water from the storage tank through the tankless water heaters to replenish the supply of hot water maintained in the storage tank. For example, U.S. Pat. No. 10,760,823 to Knoblett et al., granted on Sep. 1, 2020, titled "Hot Water Storage Tank With Integrated Pump and Controller" (hereinafter "'823 patent"), hereby incorporated by reference in its entirety, discloses an example system for pairing multiple tankless water heaters with a storage tank. The '823 patent discloses an outlet bypass circuit at the outlet of the tankless water heaters. The outlet bypass circuit is configured to supply hot water to the storage tank or to bypass the storage tank and supply hot water directly to a system hot water outlet for on-demand operation of the tankless water heaters. Accordingly, the system of the '823 patent is configurable between a high-capacity hybrid hot water system or an on-demand hot water system.

While the bypass circuit of the '823 patent facilitates flexibility in the configuration of the system, a need to service, replace, or a single point of failure in the pump and/or the storage tank may result in a loss in the ability to continue to supply hot water. Accordingly, an inlet bypass is disclosed herein. The inlet bypass comprises a storage inlet shut-off valve and an inlet bypass circuit shut-off valve. The storage inlet shut-off valve is positioned to control fluid flow through a cold water inlet of the storage tank. The inlet bypass circuit shut-off valve is positioned on an inlet bypass circuit and configured to control fluid flow through the inlet bypass circuit. The inlet bypass is configurable in a hybrid heater configuration and an on-demand configuration.

In the hybrid heater configuration, the storage inlet shut-off valve is open and the inlet bypass circuit shut-off valve is closed. Accordingly, the inlet bypass closes or otherwise prevents a direct supply path from an inlet water supply, such as municipal water, to an inlet manifold for supplying cold water to the tankless water heaters. Rather, the inlet water supply provides cold water directly to the cold water inlet of the storage tank.

As described in more detail in the '823 patent, the storage tank has a recirculation outlet that supplies cold water from the storage tank to a recirculation pump. In a recirculation operation, the recirculation pump is operated to heat water stored in the storage tank. The recirculation pump is configured to pump the cold water from the storage tank via the recirculation outlet to the inlet manifold for circulating water through the water heaters. Hot water produced by the water heaters is supplied to an outlet manifold. Each of the water heaters comprises a cold water inlet for receiving cold water and a hot water outlet for supplying hot water produced by the water heater. The cold water inlet of the water heater is fluidly connected to the inlet manifold and the hot water outlet of the water heater is fluidly connected to the outlet manifold.

Similar to the '823 patent, an outlet bypass is in fluid communication with the outlet manifold. The outlet bypass comprises a recirculation inlet shut-off valve, a storage outlet shut-off valve, and an outlet bypass shut-off valve. The recirculation inlet shut-off valve is positioned to control a fluid flow to a recirculation inlet of the storage tank. The storage outlet shut-off valve is positioned to control fluid flow through a hot water outlet of the storage tank. The outlet bypass shut-off valve is positioned on an outlet bypass circuit and configured to control fluid flow through the outlet bypass. In some implementations, the recirculation inlet shut-off valve is a check-valve biased to allow water to flow into the recirculation inlet of the storage tank and prevent water from flowing out of the recirculation inlet of the storage tank. The outlet bypass is configurable in a hybrid heater configuration and an on-demand configuration.

In the hybrid heater configuration, the recirculation inlet shut-off valve and the storage outlet shut-off valve are open and the outlet bypass shut-off valve is closed. Accordingly, the outlet bypass closes or otherwise prevents a direct supply path from the outlet manifold to a system hot water outlet. Rather, the outlet manifold provides hot water directly or via a check valve to the recirculation inlet of the storage tank.

Upon a draw event (e.g., a hot water fixture in the building is opened) in the hybrid heater configuration of the inlet and outlet bypasses, hot water is supplied from the storage tank to the hot water outlet of the storage tank for supplying hot water to the building via the system hot water outlet. Following the draw event or at another time, additional hot water is stored in the storage tank upon implementation of the recirculation operation, described above.

In the on-demand configuration of the inlet bypass, the storage inlet shut-off valve is closed and the inlet bypass circuit shut-off valve is opened. Accordingly, the inlet bypass provides a supply path from the inlet water supply directly to the inlet manifold for supplying cold water to the tankless water heaters (e.g., to the cold water inlet of the water heaters). By closing the storage inlet shut-off valve, cold water is prevented from being supplied to or draining from the storage tank via the cold water inlet of the storage tank. As described above, the tankless water heaters are configured to heat the water provided from the inlet manifold and supply hot water to an outlet manifold (e.g., via the hot water outlet of the water heaters).

In the on-demand configuration of the outlet bypass, the recirculation inlet shut-off valve and the storage outlet shut-off valves are closed and the outlet bypass shut-off valve is open. Accordingly, the outlet bypass is open to allow a direct supply path from the outlet manifold to the system hot water outlet. At the same time, water is prevented from flowing into or out of the storage tank via the recirculation inlet.

In other words, in the on-demand configuration, the inlet and outlet bypasses allow the inlet water supply to directly supply cold water to the water heaters and directly supply produced hot water to the system hot water outlet for supplying hot water to a building. Upon a draw event (e.g., a hot water fixture in the building is opened) in the on-demand configuration of the inlet and outlet bypass, hot water is supplied from the water heaters through the outlet manifold to the system hot water outlet for supplying hot water to the building. At the same time, the pump and/or the storage tank are fluidically isolated from other parts of the system to allow for repair, replacement, or maintenance while still supplying hot water to the building.

Each of the shut-off valves described herein may be a ball-valve, solenoid valve, or any other type of shut-off valve. The shut-off valves may be manually opened or closed (e.g., ball valves opened or closed by turning a handle, or solenoid valves opened or closed by pressing a button) to configure the inlet bypass and the outlet bypass in the hybrid heater configuration or the on-demand configuration. Alternatively or additionally, the shut-off valves may be automatically opened or closed, such as upon a command from a control board, to configure the inlet bypass and the outlet bypass in the hybrid heater configuration or the on-demand configuration. Automatic configuration of the inlet bypass and the outlet bypass may be performed upon detection of a fault in the system (e.g., fault in the recirculation pump and/or storage tank) or upon reconfiguration of the system (e.g., system software reconfiguration).

While examples are provided above pairing a plurality of tankless water heaters with a storage tank, in some implementations a single tankless water heater or other water heater may be paired with the storage tank.

Each of the features described above may be provided in isolation or in combination with any of the other features. Some features are contemplated to be removed from and other features are contemplated to be added. For example, the inlet bypass and outlet bypass are contemplated to also work with systems with a single water heater. Other variations are contemplated by this disclosure. Example implementations are described below with reference to the accompanying figures, but are not limiting examples.

Figure 1B:
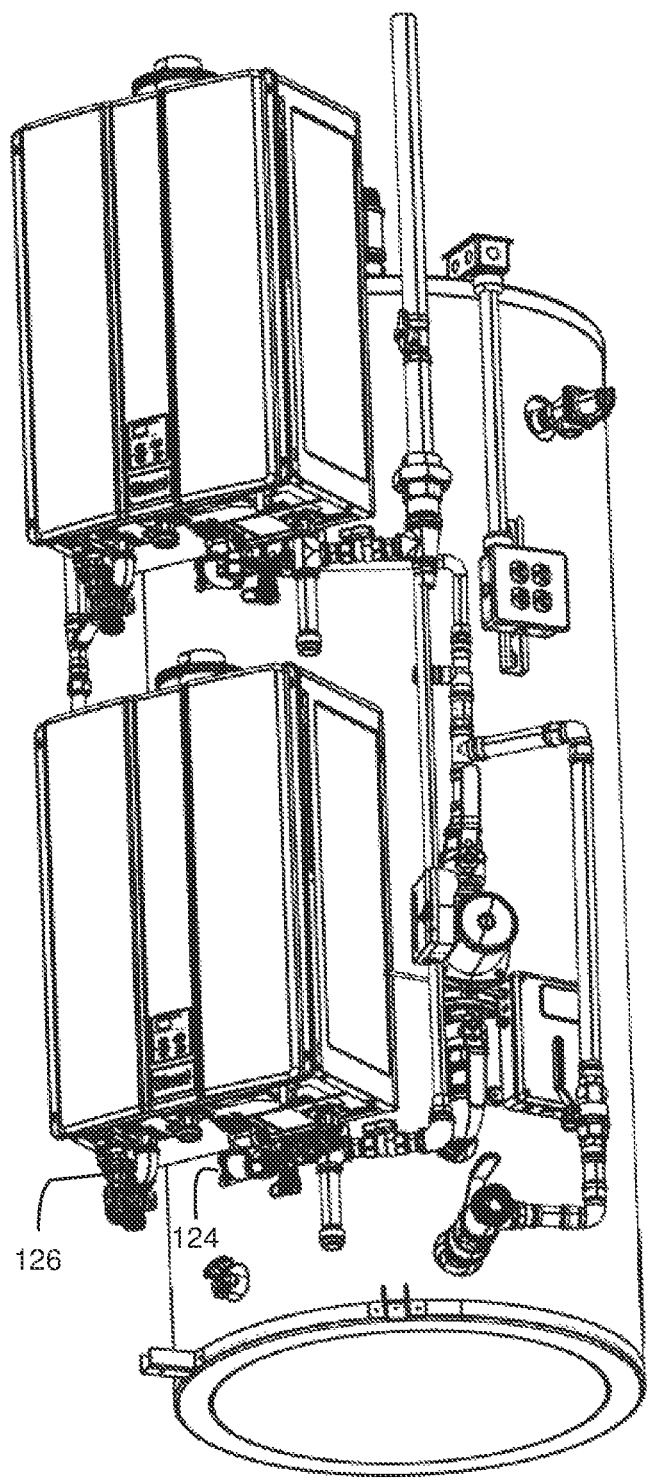
Figure 1C:
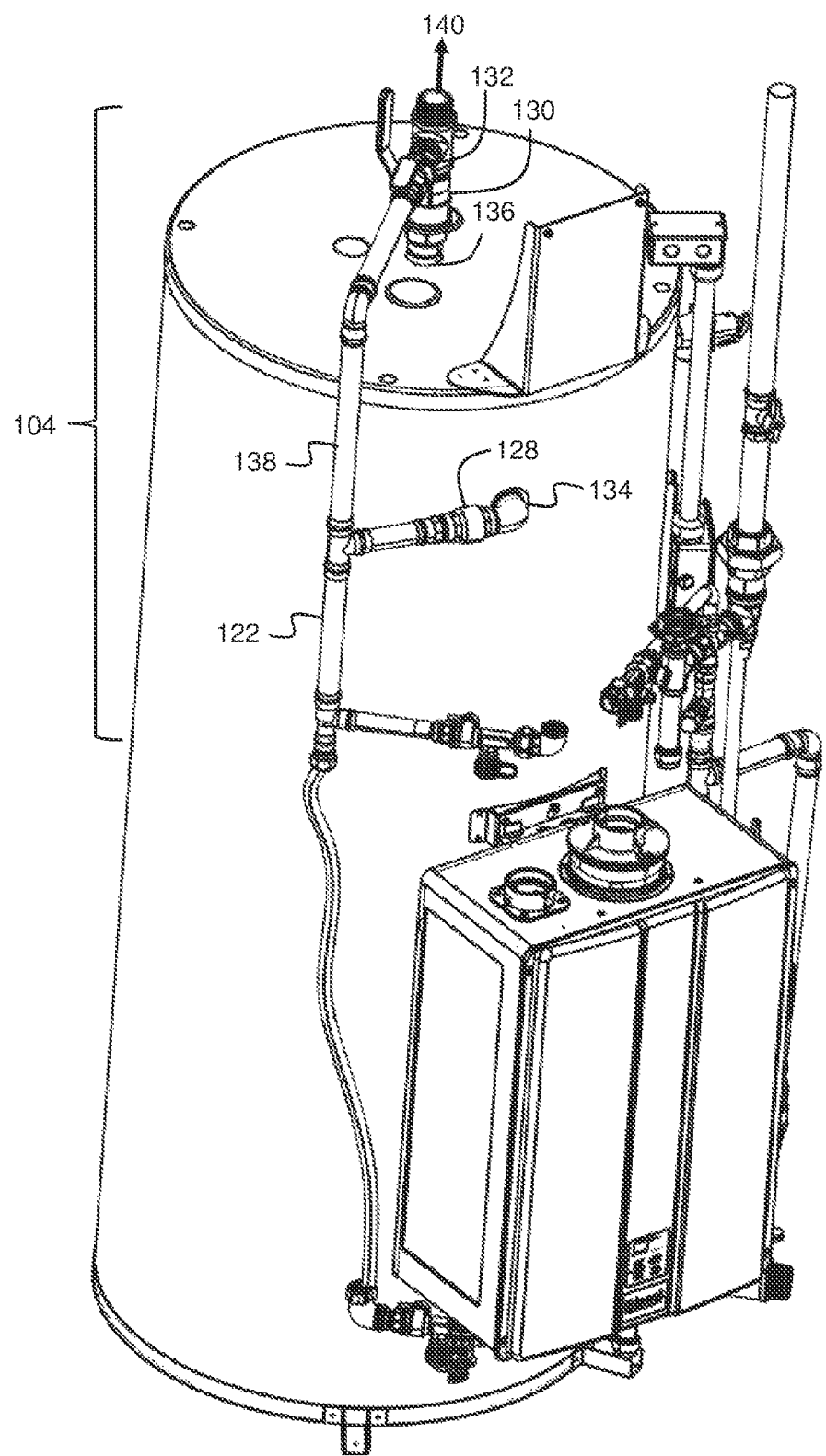

FIGS. 1A-1C illustrates an example hybrid tank and tankless hot water system 100 with an inlet bypass 102 and an outlet bypass 104 suitable for implementing the several embodiments of the disclosure. The hybrid tank and tankless hot water system 100 comprises a storage tank 101.

The inlet bypass 102 comprises a storage inlet shut-off valve 106 and an inlet bypass circuit shut-off valve 108. The storage inlet shut-off valve 106 is positioned to control fluid flow through a cold water inlet of the storage tank 110. The inlet bypass circuit shut-off valve 108 is positioned on an inlet bypass circuit 112 and configured to control fluid flow through the inlet bypass circuit 112. The inlet bypass 102 is configurable in a hybrid heater configuration and an on-demand configuration.

In the hybrid heater configuration, the storage inlet shut-off valve 106 is open and the inlet bypass circuit shut-off valve 108 is closed. Accordingly, the inlet bypass 102 closes or otherwise prevents a direct supply path from an inlet water supply (not shown), such as municipal water, to an inlet manifold 114 for supplying cold water to the tankless water heaters 116a,b. Rather, the inlet water supply provides cold water directly to the cold water inlet of the storage tank 110.

The storage tank 101 has a recirculation outlet 118 that supplies cold water from the storage tank 101 to a recirculation pump 120. In a recirculation operation, the recirculation pump 120 is operated to heat water stored in the storage tank 101. The recirculation pump 120 is configured to pump the cold water from the storage tank 101 via the recirculation outlet 118 to the inlet manifold 114 for circulating water through the water heaters 116a,b. Hot water produced by the water heaters 116a,b is supplied to an outlet manifold 122. Each of the water heaters comprises a cold water inlet 124 for receiving cold water and a hot water outlet 126 for supplying hot water produced by the water heaters 116a,b. The cold water inlet 124 of the water heater is fluidly connected to the inlet manifold 114 and the hot water outlet 126 of the water heater is fluidly connected to the outlet manifold 122.

The outlet bypass 104 is in fluid communication with the outlet manifold 122. The outlet bypass 104 is best seen in FIG. 10 with the water heater 116a removed. The outlet bypass 104 comprises a recirculation inlet shut-off valve 128, a storage outlet shut-off valve 130, and an outlet bypass shut-off valve 132. The recirculation inlet shut-off valve 128 is positioned to control a fluid flow to a recirculation inlet of the storage tank 134. The storage outlet shut-off valve 130 is positioned to control fluid flow through a hot water outlet of the storage tank 136. The outlet bypass shut-off valve 132 is positioned on an outlet bypass circuit 138 and configured to control fluid flow through the outlet bypass 104. In some implementations, the recirculation inlet shut-off valve 128 is a check-valve biased to allow water to flow into the recirculation inlet of the storage tank 134 and prevent water from flowing out of the recirculation inlet of the storage tank 134. The outlet bypass 104 is configurable in a hybrid heater configuration and an on-demand configuration.

In the hybrid heater configuration, the recirculation inlet shut-off valve 128 and the storage outlet shut-off valve 130 are open and the outlet bypass shut-off valve 132 is closed. Accordingly, the outlet bypass closes or otherwise prevents a direct supply path from the outlet manifold 122 to a system hot water outlet 140. Rather, the outlet manifold 122 provides hot water directly or via a check valve to the recirculation inlet of the storage tank 134.

Upon a draw event (e.g., a hot water fixture in the building is opened) in the hybrid heater configuration of the inlet bypass 102 and outlet bypass 104, hot water is supplied from the storage tank 101 to the hot water outlet of the storage tank 136 for supplying hot water to the building via the system hot water outlet 140. Following the draw event or at another time, additional hot water is stored in the storage tank 101 upon implementation of the recirculation operation, described above.

In the on-demand configuration of the inlet bypass 102, the storage inlet shut-off valve 106 is closed and the inlet bypass circuit shut-off valve 108 is opened. Accordingly, the inlet bypass provides a supply path from the inlet water supply directly to the inlet manifold 114 for supplying cold water to the tankless water heaters (e.g., to the cold water inlet 124 of the water heaters). By closing the storage inlet shut-off valve, cold water is prevented from being supplied to or draining from the storage tank 101 via the cold water inlet of the storage tank 110. As described above, the tankless water heaters are configured to heat the water provided from the inlet manifold 114 and supply hot water to an outlet manifold 122 (e.g., via the hot water outlet 126 of the water heaters).

In the on-demand configuration of the outlet bypass, the recirculation inlet shut-off valve 128 and the storage outlet shut-off valve 130 are closed and the outlet bypass shut-off valve 132 is open. Accordingly, the outlet bypass is open to allow a direct supply path from the outlet manifold 122 to the system hot water outlet 140. At the same time, water is prevented from flowing into or out of the storage tank 101 via the recirculation inlet.

In other words, in the on-demand configuration, the inlet and outlet bypasses allow the inlet water supply to directly supply cold water to the water heaters and directly supply produced hot water to the system hot water outlet 140 for supplying hot water to a building. Upon a draw event (e.g., a hot water fixture in the building is opened) in the on-demand configuration of the inlet and outlet bypass, hot water is supplied from the water heaters through the outlet manifold 122 to the system hot water outlet 140 for supplying hot water to the building. At the same time, the pump and/or the storage tank 101 are fluidically isolated from other parts of the system to allow for repair, replacement, or maintenance while still supplying hot water to the building.

Each of the shut-off valves described herein may be a ball-valve, solenoid valve, or any other type of shut-off valve. The shut-off valves may be manually opened or closed (e.g., ball valves opened or closed by turning a handle, or solenoid valves opened or closed by pressing a button) to configure the inlet bypass and the outlet bypass in the hybrid heater configuration or the on-demand configuration. Alternatively or additionally, the shut-off valves may be automatically opened or closed, such as upon a command from a control board, to configure the inlet bypass and the outlet bypass in the hybrid heater configuration or the on-demand configuration. Automatic configuration of the inlet bypass and the outlet bypass may be performed upon detection of a fault in the system (e.g., fault in the recirculation pump 120 and/or storage tank) or upon reconfiguration of the system (e.g., system software reconfiguration).

While several embodiments have been provided in the present disclosure, the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A hybrid tank and tankless water heater system configured to receive cold water at a system cold water inlet and provide hot water to a system hot water outlet, comprising:
   a storage tank comprising a cold water inlet in fluid communication with the system cold water inlet, a recirculation inlet, and a hot water outlet in fluid communication with the system hot water outlet;
   a water heater comprising a cold water inlet and a hot water outlet in fluid communication with the recirculation inlet of the storage tank;
   an inlet bypass, comprising:

a storage inlet shut-off valve positioned to control fluid flow through the cold water inlet of the storage tank;
an inlet bypass circuit positioned between the system cold water inlet and the cold water inlet of the water heater; and
an inlet bypass circuit shut-off valve positioned to control fluid flow through the inlet bypass circuit;
a second water heater comprising a second cold water inlet and a second hot water outlet; and
an inlet manifold fluidically coupled to the cold water inlet of the water heater and the second cold water inlet of the second water heater,
wherein the inlet bypass circuit is positioned between the system cold water inlet and the inlet manifold.

2. The system of claim 1, wherein the storage inlet shut-off valve is positioned between the inlet bypass circuit and the cold water inlet of the storage tank.

3. A hybrid tank and tankless water heater system configured to receive cold water at a system cold water inlet and provide hot water to a system hot water outlet, comprising:
a storage tank comprising a cold water inlet in fluid communication with the system cold water inlet, a recirculation inlet, and a hot water outlet in fluid communication with the system hot water outlet;
a water heater comprising a cold water inlet and a hot water outlet in fluid communication with the recirculation inlet of the storage tank;
an inlet bypass, comprising:
a storage inlet shut-off valve positioned to control fluid flow through the cold water inlet of the storage tank;
an inlet bypass circuit positioned between the system cold water inlet and the cold water inlet of the water heater; and
an inlet bypass circuit shut-off valve positioned to control fluid flow through the inlet bypass circuit, wherein the inlet bypass is configurable in a hybrid heater configuration and an on-demand configuration,
wherein in the hybrid heater configuration, the storage inlet shut-off valve is open and the inlet bypass circuit shut-off valve is closed,
wherein in the on-demand configuration, the storage inlet shut-off valve is closed and the inlet bypass circuit shut-off valve is open,
an outlet bypass in fluid communication with the hot water outlet of the water heater, the outlet bypass comprising:
a recirculation inlet shut-off valve positioned to control fluid flow to the recirculation inlet of the storage tank;
an outlet bypass circuit positioned between the hot water outlet of the water heater and the system hot water outlet; and
an outlet bypass circuit shut-off valve positioned to control fluid flow through the outlet bypass circuit.

4. The system of claim 3, further comprising:
a second water heater comprising a second cold water inlet and a second hot water outlet; and
an outlet manifold fluidically coupled to the hot water outlet of the water heater and the second hot water outlet of the second water heater,
wherein the outlet bypass circuit is positioned between the outlet manifold and the system hot water outlet.

5. The system of claim 3, wherein the storage tank further comprises a recirculation outlet, the system further comprising:
a recirculation pump positioned to draw water from the recirculation outlet and pump water to the cold water inlet of the water heater.

6. The system of claim 5, further comprising:
a pump outlet isolation valve positioned between the recirculation pump and the cold water inlet of the water heater.

7. The system of claim 6, wherein an outlet of the inlet bypass circuit is positioned to supply cold water between the pump outlet isolation valve and the cold water inlet of the water heater.

8. A storage tank of a hybrid tank and tankless water heater system configured to receive cold water at a system cold water inlet and provide hot water to a system hot water outlet, comprising:
a storage tank comprising a cold water inlet in fluid communication with the system cold water inlet, a recirculation inlet, and a hot water outlet in fluid communication with the system hot water outlet; and
an inlet bypass, comprising:
a storage inlet shut-off valve positioned to control fluid flow through the cold water inlet of the storage tank;
an inlet bypass circuit positioned between the system cold water inlet and a cold water inlet of the tankless water heater system; and
an inlet bypass circuit shut-off valve positioned to control fluid flow through the inlet bypass circuit, wherein the inlet bypass is configurable in a hybrid heater configuration and an on-demand configuration,
wherein in the hybrid heater configuration, the storage inlet shut-off valve is open and the inlet bypass circuit shut-off valve is closed, and
wherein in the on-demand configuration, the storage inlet shut-off valve is closed and the inlet bypass circuit shut-off valve is open;
an outlet bypass in fluid communication with a hot water outlet of the tankless water heater system, the outlet bypass comprising:
a recirculation inlet shut-off valve positioned to control fluid flow to the recirculation inlet of the storage tank;
an outlet bypass circuit positioned between the hot water outlet of the tankless water heater system and the system hot water outlet; and
an outlet bypass circuit shut-off valve positioned to control fluid flow through the outlet bypass circuit.

9. The storage tank system of claim 8, wherein the tankless water heater system comprises a plurality of tankless water heaters, the storage tank system further comprising:
an inlet manifold fluidically coupled to a cold water inlet of the plurality of tankless water heaters,
wherein the inlet bypass circuit is positioned between the system cold water inlet and the inlet manifold.

10. The storage tank system of claim 8, wherein the tankless water heater system comprises a plurality of tankless water heaters, the storage tank system further comprising:
an outlet manifold fluidically coupled to a hot water outlet of the plurality of tankless water heaters,
wherein the outlet bypass circuit is positioned between the outlet manifold and the system hot water outlet.

11. The storage tank system of claim 8, wherein the storage tank further comprises a recirculation outlet, the storage tank system further comprising:
a recirculation pump positioned to draw water from the recirculation outlet and pump water to the cold water inlet of the tankless water heater system.

12. The storage tank system of claim 11, further comprising:

a pump outlet isolation valve positioned between the recirculation pump and the cold water inlet of the tankless water heater system.

13. The storage tank system of claim 12, wherein an outlet of the inlet bypass circuit is positioned to supply cold water between the pump outlet isolation valve and the cold water inlet of the tankless water heater system.

14. The storage tank system of claim 8, wherein the storage inlet shut-off valve is positioned between the inlet bypass circuit and the cold water inlet of the storage tank.

* * * * *